G. E. BARKSDALE.
HUMIDIFIER FOR INTERNAL COMBUSTION ENGINE FUEL.
APPLICATION FILED NOV. 7, 1913.
1,119,487.
Patented Dec. 1, 1914.
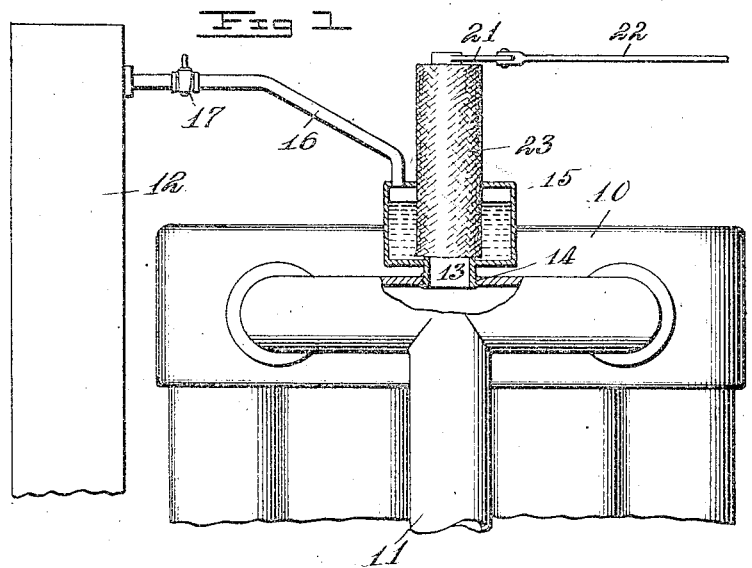
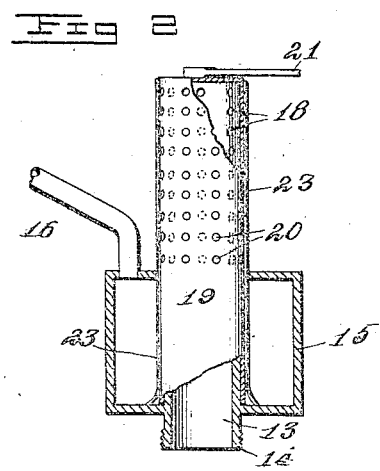
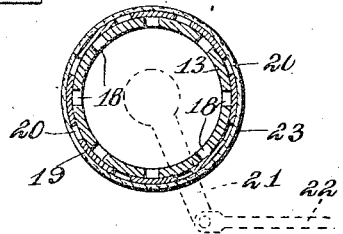
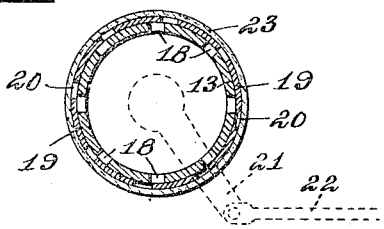
Witnesses
H. E. Robinette
J. J. Mawhinney
Inventor
George E. Barksdale
By Luymer Cushman Rey
Attorney

UNITED STATES PATENT OFFICE.

GEORGE E. BARKSDALE, OF RICHMOND, VIRGINIA.

HUMIDIFIER FOR INTERNAL-COMBUSTION-ENGINE FUEL.

1,119,487.      Specification of Letters Patent.      Patented Dec. 1, 1914.

Application filed November 7, 1913. Serial No. 799,722.

*To all whom it may concern:*

Be it known that I, GEORGE E. BARKSDALE, a citizen of the United States, residing at Richmond, in the county of Henrico and State of Virginia, have invented new and useful Improvements in Humidifiers for Internal-Combustion-Engine Fuel, of which the following is a specification.

This invention relates to a device for introducing moisture laden air into the vaporized fuel as it passes from the carbureter to the intake of an internal combustion engine, and has for its object to economize in the consumption of fuel, minimize carbonization in the combustion chamber of the engine and increase the power of the engine proportionately to the amount of fuel consumed.

It is a further object of this invention to provide a device which may be applied to all forms of internal combustion engines, and a device which may be adjusted to introduce the proper amount of moistened air to the vaporized fuel according to the desired speed of the engine.

The invention also aims at the production of a device wherein heated water or other liquid, in the radiator of an automobile or the like, may be utilized for moistening the air and raising the temperature of the air so that warm moistened air may be introduced into the fuel vapor.

Other objects and advantages of this invention will appear from the following description of the present and preferred embodiment of the invention, the same being illustrated in the accompanying drawing wherein—

Figure 1 is a side elevation of the device, partly in section, and as applied to the manifold of an internal combustion engine. Fig. 2 is a detail sectional view of the humidifier, parts of the same being broken away. Fig. 3 is a transverse section through the upper end of the device showing the same adjusted to cut off the supply of moistened air, and Fig. 4 is a similar view disclosing the device partly open to admit a small quantity of moistened air to the manifold.

In Fig. 1 there is conventionally shown an internal combustion engine 10 having connected to the intake thereof a manifold 11 leading from a carbureter, not shown. A radiator 12 is also disclosed which in the usual manner supplies the jackets of the internal combustion engine 10 with a cooling liquid.

The device of this invention comprises a preferably tubular body 13 having an externally threaded lower end 14 for engagement through one of the walls of the manifold 11, preferably at the juncture of the arms of the manifold as shown in Fig. 1. The tubular body 13 carries about its lower end and spaced slightly above the manifold 10 a cup 15 closed at its top and having connection by a pipe 16 with the radiator 12, a valve 17 being placed in the pipe 16 to regulate the flow of the fluid from the radiator 12 into the cup 15. The tubular body 13 is provided in its walls, and above the cup 15 with a plurality of relatively small openings or perforations 18 communicating with the interior of the body and through the same with the manifold 11. Tightly fitting over the body 13 and adapted to slide or turn thereon is a tubular sleeve 19 extending down into the cup 15 and having openings or perforations 20 in its walls adapted at times to register with the openings or perforations 18 in the body 13 when the sleeve 19 is moved. The body 13 and the sleeve 19 are closed at their upper ends, and the sleeve 19 is provided preferably upon its upper end with a laterally extending arm 21 connected to an operating rod 22 extending to any suitable point from which it is desired to adjust the device. The rod may be connected to the steering post of an automobile, to the dash thereof, or may extend to any point near the operator controlling the engine, dependent upon the use for which the engine is adapted.

The sleeve 19 is provided with a preferably exterior covering of absorbent material which entirely covers the sleeve 19 and extends therewith down into the cup 15. This covering, indicated at 23 in the drawings, acts as a wick and raises the water or fluid in the cup 15 by capillary attraction to the top of the sleeve and effects the thorough saturation of the covering 23.

In use the device is adjusted, as shown in Fig. 3, when it is not desired to introduce the moistened air into the manifold 11. It will be noted that the arm 21 is in position to hold the sleeve 19 to keep the openings 18 and 20 out of register so that any suction in the manifold 11 will not draw in any air from the device. When it is desired to introduce moistened air into the manifold the arm 21 is moved into the position disclosed in dotted lines in Fig. 4. In this latter position the sleeve 19 is turned so as to partly register the openings 18 and 20 with each other admitting fine streams of air to the interior of the tubular body 13 which streams of air are drawn through the moistened wick or covering 23 effecting the moistening of the air by the liquid absorbed. The sleeve 19 is adjusted to more or less register the openings 18 and 20 so as to admit a greater or less amount of air to the intake 11. Preferably, the cup 15 is connected to the radiator 12, as shown, so that the heated water or fluid in the radiator passes to the cup 15 by gravity, and, since the water in the cup 15 is heated and is absorbed by the covering 23, the air passing through the covering is raised in temperature and a heated and moistened stream of air is thus drawn into the manifold 11 to intermingle with the vaporized fuel passing to the cylinders. In this manner the air drawn in through this device does not act to chill the fuel vapor but, after the water in the radiator has become warm, acts to raise the temperature of the fuel vapor.

It is to be understood that any suitable water supply tank other than the radiator 12 may be employed if found more desirable or convenient and that various other modifications may be made in the detail construction of the device, the same being limited only by the scope of the appended claims.

What is claimed is—

1. A humidifier comprising a hollow body having perforations in its upper end, a liquid container surrounding the lower end of said body, a sleeve surrounding the body and having perforations in its upper end adapted to register with the perforations in the body whereby air is admitted through the perforations into the body, and an absorbent covering carried about said sleeve and engaging at its lower end in said liquid container.

2. A humidifier comprising a hollow body, a sleeve surrounding the body, a wick surrounding the sleeve, said body and said sleeve having perforations therein, means for turning the sleeve on the body adapted to register the respective perforations in the body and the sleeve, a liquid container surrounding the lower end of the wick, and a supply tank communicating with the liquid container to supply liquid to the same.

3. A humidifier comprising a perforated hollow body, an outer perforated member engaging the body, operating means for moving said member to register the perforations therein with the perforations in the body, an absorbent covering engaging over the perforations of the member, and means for supplying a liquid to said covering.

4. A device of the character described comprising a hollow body adapted for communication with the manifold of an internal combustion engine, a movable member surrounding the body, a wick inclosing said member, said body and said member having openings therein, means for adjusting said member relative to the body to register said opening whereby to admit air through said wick and said opening to the interior of the body, a liquid container surrounding the lower end of the wick, and means for supplying heated water to said container, said wick being adapted to absorb the heated water whereby the air passing through the wick and the body is heated.

In testimony whereof I have hereunto set my hand in presence of two subscribing witnesses.

GEORGE E. BARKSDALE.

Witnesses:
  A. R. McCalley,
  R. W. Rogers.